E. L. Norfolk.
Dressing Flax.

Nº 10,876. Patented May 9, 1854.

N. PETERS, PHOTO-LITHOGRAPHER, WASHINGTON, D. C.

UNITED STATES PATENT OFFICE.

E. L. NORFOLK, OF SALEM, MASSACHUSETTS.

IMPROVEMENT IN MACHINERY FOR DRESSING FLAX.

Specification forming part of Letters Patent No. 10,876, dated May 9, 1854.

*To all whom it may concern:*

Be it known that I, E. L. NORFOLK, of Salem, in the county of Essex and State of Massachusetts, have invented certain new and useful improvements in machinery for dressing flax or any other fibrous materials to whose treatment they may be found applicable, and preparing the same for spinning; and I do hereby declare that the following is a full, clear, and exact description of the same, reference being had to the accompanying drawings, forming part of this specification, in which—

Figure 1:
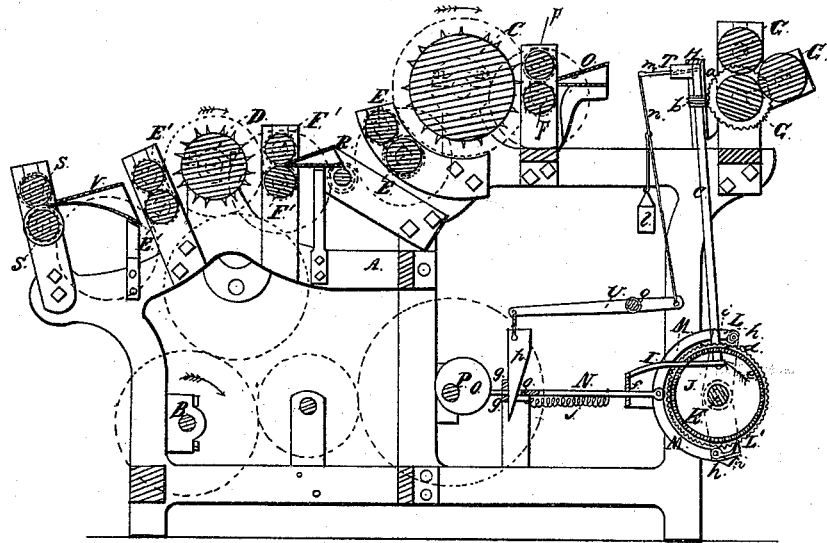
Figure 4:
Figure 3:
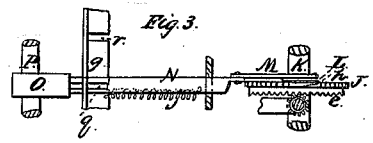
Figures 2, 5:
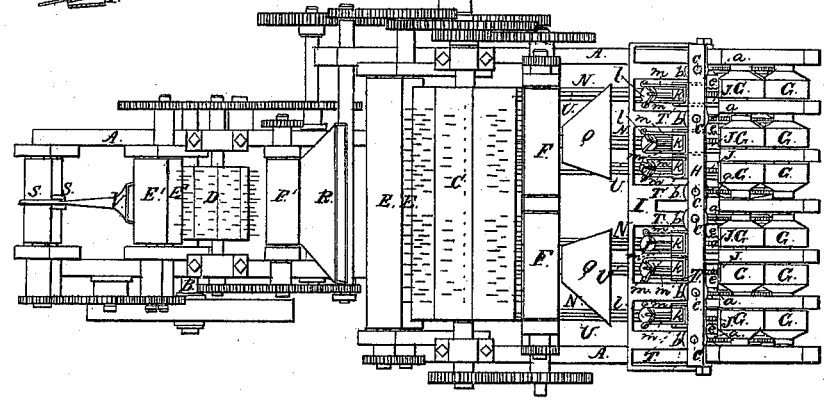

Figure 1 is a longitudinal vertical section of a machine having my improvements, and Fig. 2 is a plan of the same. Fig. 3 is a plan of part of the apparatus which regulates the feed. Fig. 4 is a perspective view of one of the regulating trunks, and Fig. 5 is a longitudinal vertical section of the same.

Similar letters of reference indicate corresponding parts in each of the several figures.

My invention consists in a certain device for regulating the movements of the rollers which supply the flax to the machine, whereby the said rollers are made to feed the material at a speed corresponding inversely with the quantity passing between them, or to stop entirely when the quantity becomes so great as to render a stoppage necessary.

To enable those skilled in the art to make and use my invention, I will proceed to describe its construction and operation.

The working parts of the machine are all supported by the frame A, and receive motion from the driving-shaft B. In this machine only two toothed cylinders, C and D, are used, the first of which, C, revolves at a comparatively slow speed, and is placed in suitable bearings between the pair of drawing-rollers E E, and the two pairs of feed-rollers F F, all of which are hung in suitable bearings parallel with it, and as close as practicable to the points of its teeth. The peripheries of the feed-rollers F F revolve at about one-sixth of the speed of the points of the teeth of the cylinder C, and those of the drawing-rollers E E at the same or a little greater speed than the points of the said teeth. The second toothed cylinder, D, is placed in suitable bearings between a pair of feed-rollers, F' F', and a pair of drawing-rollers, E' E', which are also hung in suitable bearings, and revolve at about the same speed in relation to the points of its teeth as the first-named feed and drawing rollers do to the teeth of the first cylinder. The feed-rollers F' F' must revolve at the same speed or faster than the drawing-rollers E E; hence the points of the teeth of D will remove at about six times the speed of those of C. The feed-rollers G G G, which supply the flax, in the first instance, to the machine, are in six sets; but any number of sets may be used, each being hung in independent bearings. There are three rollers in each set, and they receive an intermittent rotary motion by the following means. On the lowest roller of each set is a toothed wheel, $a$, into which gears an endless screw, $b$, near the upper end of an upright shaft, $c$, which works in bearings in a cross-piece, H, at the top and a support, I, at the bottom. This shaft carries near its lower end a toothed wheel, $d$, which gears into the teeth $e$ on the face of one of six wheels J, (of which one is for each set of feed-rollers,) which are all hung loosely on a horizontal shaft, K. Each of the wheels J, in addition to the teeth $e$ on its face, has teeth on its periphery, and the last-named teeth are engaged by two pawls, $h\ h$, attached to two short levers, L L', both working loosely on the shaft K as a fulcrum. These levers are connected by two curved links, M M, which partly encircle the shaft K, to a bar, N, which slides freely in horizontal guides $f$ and $g$, one lever occupying a position above and the other below the shaft, and the pawls $h\ h$ being so arranged that when a horizontal reciprocating motion is given to the bar N the levers will cause the pawls to act alternately to turn the wheel in the direction of the arrow shown on it in Fig. 1 as the bar moves in opposite directions, the pawls being always kept in working position by springs $i\ i$. The reciprocating movement of the bar N necessary to work the levers and pawls is given by means of one of six eccentrics O (of which one is for each set of feed-rollers) on a shaft, P, which receives motion through gearing from the main shaft and a spring, $j$, which is connected to the bar N and to the guide $g$, the bar being forced back or toward the wheel J by the eccentric, and being drawn forward against a suitable stop, which will be hereinafter described, by the spring $j$. The intermittent rotary motion of the wheel J gives a similar motion to the upright c, and by it is communicated to the rollers G G G at a greatly-reduced speed. The speed of the revolution of the shaft P is such that the revolution given to the feed-rollers G G G is much slower than that of the rollers F F, as the latter, in addition to serving as feed-rollers to the cylinder C, serve as drawing-rollers and give the first draw to the fibers. The position of the several eccentrics on the shaft P should be such that they will cause the intermittent movements of the rollers G G G to commence successively, and not all at once, to insure greater regularity in the aggregate feed. The quantities of fiber delivered by the several sets of rollers, G G G, are collected into two larger quantities by passing through two funnels, Q Q—one behind each pair of rollers F F—and so collected are fed by the latter rollers to the drawing-rollers E E, by which they are drawn out. During the drawing operation the toothed cylinder C opens and separates the fibers, combs or lays them straight and parallel, and takes out all the tow. After leaving the drawing-rollers E E the fibers are conducted through a funnel, R, which collects them all in one quantity, and so collected conducts them to the rollers F' F', which feed them to the next pair of drawing-rollers, E' E', by which they are again drawn out. During the second drawing the fibers are submitted to the operation of the second toothed cylinder D, which repeats the operation of the cylder C. From the rollers E' E' the material is delivered into another funnel, V, by which they are condensed from the form of a thin flat sheet into a sliver and conducted between two rollers, S S, which compress them together and deliver them in a condition for roving.

The combination of the toothed cylinders C and D and the rollers E E, E' E', and F F, F' F' is found to effect the separating, straightening, drawing out, and cleaning of the fibers with an extraordinary degree of perfection and rapidity, and by separating the feed which supplies the machine, in the first instance, and then drawing and afterward doubling repeatedly, the sliver is made of comparatively-uniform thickness; but in order to make the uniformity perfect, it is necessary to equalize, in the greatest possible degree, the feed from each set of rollers G G G, and for this purpose I employ the trunks T—one for each set of rollers—placed as close as possible in front of the rollers, and open at the back and front, to allow the free passage of the flax. The trunks are attached to the cross-piece H, and each is furnished with a mouth-piece or lid, k, which is hinged at its back end at the upper part of the back of the trunk, and has its front end resting upon the bottom of the trunk, or upon whatever is placed therein or passing through it, resting therefore upon the flax. A weight, l, is suspended from the end of a pair of arms, m m, which stand out from the front of the lid or mouth-piece, and this weight causes the flax to be tightly compressed in the trunk. The arms m m are connected by a rod, n, to the shorter arm of a lever, U, of the first order, which works upon a fixed fulcrum, o, the longer arm of the said lever having a wedge, p, suspended from it, which wedge constitutes the stop, before alluded to, for arresting the forward motion of the bar N. The wedge p works in a slot, q, in the forward end of the said bar, passes through a slot, r, in the guide-bar g, and rests against the back side of the front part of the said guide-bar, which (as will be seen by reference to Fig. 1) is of angular form. The bar N is arrested in its forward motion by the back part of the slot r coming in contact with the wedge, and the height of the wedge will therefore regulate its movement. When the wedge is raised, so that its point only enters the slot, it will not arrest the bar at all, and consequently the latter then receives the full throw of the eccentric; but when the broadest part of the wedge is in the slot the bar is pushed so far back that the eccentric will scarcely act upon it at all; or the wedge may be made broad enough to stop the movement of the bar N entirely, and thus stop the feed. The parts are so adjusted that when the proper quantity is being fed through the trunks the mouth-piece k will, by means of the arms m m, rod n, and lever U, hold the wedge such a height as to allow the bar N the proper movement necessary to give the feed-rollers the required amount of motion every time they act, and should there be any increase in the quantity of feed the mouth-piece will be raised and cause the wedge to be depressed, and therefore lessen the length of the feed, the contrary effect being produced if the quantity of the feed decreases. The amount of feed may be increased or decreased at pleasure by altering the length of the rod n or by altering the distance of the wedge from the lever U.

I do not claim the employment of trunks with movable lids, by the rising and falling of which the rate of feed is regulated; but I do claim—

Governing the movements of the rollers G G G, which supply the material to the machine by means of wedges p, which are suspended in such a way as to be caused by the rising and falling of the movable lids k, or their equivalents, to rise and fall, and thus regulate the position of bars N, which are acted upon by eccentrics or cams O, for the purpose of transmitting motion to the feed, and thereby regulate the amount of motion which the said bars receive from the said eccentrics or cams, substantially as herein set forth.

E. L. NORFOLK.

Witnesses:
E. W. KIMBALL,
HENRY M. BROOKS.